(12) United States Patent
Adams et al.

(10) Patent No.: US 8,250,194 B2
(45) Date of Patent: Aug. 21, 2012

(54) POWERTAG: MANUFACTURING AND SUPPORT SYSTEM METHOD AND APPARATUS FOR MULTI-COMPUTER SOLUTIONS

(75) Inventors: Mark A. Adams, Georgetown, TX (US); Victor V. R. Mashayekhi, Round Rock, TX (US); Edward H. Yardumian, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 702 days.

(21) Appl. No.: 12/144,951

(22) Filed: Jun. 24, 2008

(65) Prior Publication Data
US 2008/0255872 A1 Oct. 16, 2008

Related U.S. Application Data

(62) Division of application No. 09/916,596, filed on Jul. 27, 2001, now Pat. No. 7,401,136.

(51) Int. Cl.
G06F 15/16 (2006.01)
G06F 15/177 (2006.01)

(52) U.S. Cl. ........................................ 709/223; 709/217

(58) Field of Classification Search .................. 709/220, 709/235, 223, 217; 705/28, 56, 323, 27; 171/171; 455/463; 717/177; 725/34; 726/9
See application file for complete search history.

(56) References Cited

U.S. PATENT DOCUMENTS

| 5,745,568 | A * | 4/1998 | O'Connor et al. ............. 705/56 |
|---|---|---|---|
| 5,758,070 | A | 5/1998 | Lawrence |
| 5,794,237 | A | 8/1998 | Gore, Jr. |
| 5,822,743 | A | 10/1998 | Gupta et al. |
| 5,825,651 | A | 10/1998 | Gupta et al. |
| 6,021,429 | A | 2/2000 | Danknick |
| 6,023,699 | A | 2/2000 | Knoblock et al. |
| 6,038,597 | A | 3/2000 | Van Wyngarden |
| 6,064,982 | A | 5/2000 | Puri |
| 6,098,061 | A | 8/2000 | Gotoh et al. |
| 6,173,332 | B1 * | 1/2001 | Hickman ...................... 709/235 |
| 6,249,814 | B1 | 6/2001 | Shaffer et al. |
| 6,321,532 | B1 | 11/2001 | Komush |
| 6,438,535 | B1 | 8/2002 | Benjamin et al. |
| 6,578,074 | B1 * | 6/2003 | Bahlmann ..................... 709/220 |
| 6,647,532 | B1 | 11/2003 | Boede et al. |
| 6,754,816 | B1 | 6/2004 | Layton et al. |
| 6,754,895 | B1 * | 6/2004 | Bartel et al. .................. 717/171 |
| 6,772,204 | B1 | 8/2004 | Hansen |
| 6,785,805 | B1 | 8/2004 | House et al. |
| 6,842,749 | B2 * | 1/2005 | Zara et al. ............................ 1/1 |
| 6,957,186 | B1 * | 10/2005 | Guheen et al. ................ 705/323 |
| 7,013,462 | B2 * | 3/2006 | Zara et al. ..................... 717/177 |
| 7,117,169 | B2 * | 10/2006 | Zara et al. ....................... 705/28 |
| 7,240,364 | B1 * | 7/2007 | Branscomb et al. ............. 726/9 |
| 2002/0002569 | A1 | 1/2002 | Nguyen et al. |
| 2002/0052807 | A1 * | 5/2002 | Han et al. ......................... 705/27 |
| 2002/0119792 | A1 * | 8/2002 | Silvestri ......................... 455/463 |
| 2005/0210502 | A1 * | 9/2005 | Flickinger et al. .............. 725/34 |

* cited by examiner

*Primary Examiner* — Aaron Strange

(74) *Attorney, Agent, or Firm* — Haynes and Boone, LLP

(57) ABSTRACT

A solutions-based computer system manufacturing process includes assembling computer and storage system components for creation of a given solution-based product as a function of a customer order or plan. The process further includes assigning a solution identifier to the solution-based product. The solution identifier includes a solution type and a unique identifier within the solution type.

14 Claims, 3 Drawing Sheets

POWERTAG: MANUFACTURING AND SUPPORT SYSTEM METHOD AND APPARATUS FOR MULTI-COMPUTER SOLUTIONS

CROSS-REFERENCE TO RELATED APPLICATION

This application claims priority to and is a divisional of co-owned co-pending U.S. patent application Ser. No. 09/916,596, filed Jul. 27, 2001, which is incorporated herein by reference in its entirety.

BACKGROUND

This disclosure generally relates to computer system manufacturing and service, and more particularly, to supporting solutions-based system apparatus and methods. A method is needed to service a built-to-order group of distinct computer systems that the customer intends to interconnect in a way that makes them a "solution".

Computer system manufacturers face major challenges with on-line support, phone-based technical support, on-site service, and the upgrade processes for solutions-based products such as Storage Area Networks (SANs), Network Attached Storage (NAS), server clusters, and more recently, e-commerce configurations consisting of multiple servers, storage systems, software components, and networking interconnects. Historically focused on "boxed systems", a build-to-order computer manufacturer assigns "Service Tags" to individual computer systems whether they are used as individual systems or as part of a larger system of components to provide a solution. While this approach is adequate to service and upgrade a single monolithic box (the box), it fails to work when that box is an integral part of a larger solution with complex interdependencies.

On-Line Support:

As a build-to-order computer manufacturer's computing solutions become increasingly complex, the ability to post product and educational documentation, technical alerts, and software updates online will be a critical requirement for success in the respective market space. For example, the prompt availability and accessibility of a single software driver update may be needed to solve a critical problem in a large solution such as a Storage Area Network or Server Cluster. Using just a service tag, there is no way to associate the needs of the solution with the needs of the specific box. The ability to post product and educational documentation, technical alerts, and software updates for the solution online will also be a major challenge with respect to Storage Domain Management (SDM) and storage virtualization products.

With conventional on-line support systems, customers and computer manufacturer support personnel access updates and information via mechanisms such as on-line support systems and various search tools. Further, with conventional on-line support systems, documentation, OEM recommendations, and knowledge base searches are provided via the service tag. Providing information to the customer using a single machine's service tag cannot account for the complexities of interconnecting that device with other devices and software in distributed environments. The conventional on-line support system possesses no capability to correlate multiple systems and software components involved in solving a complex problem. For example, if a given configuration comprises a server cluster using Microsoft's Cluster Server software, then the configuration includes the exact server models the customer is using, the shared storage enclosure(s), the operating system, the clustering software, and any other system components such as cluster-enabled RAID controllers. These components have individual support characteristics associated with them, but there is also a superset of support required for the implementation as a whole and the software components. This superset of support might include certain diagnostics routines to trouble-shoot any problems in the solution, validation routines to check for correct installation and wiring of the boxes in the solution, capture and audit mechanisms for reporting asset information for the entire solution, monitoring routines for sending health information to the support lines via the Internet, and the like.

Conventionally, none of the above identified configuration items are tied together when on-line support offerings and resources are presented in response to an on-line support inquiry. As a result, the support given might not be relevant to the particular configuration. For example, a customer may require a software update specific to a certain cluster configuration. The particular customer may be unable to locate the desired software update file because the conventional system lacks capability to search for updates based on the cluster configuration.

Tech Support:

The "Service Tag-centric" approach to support causes errors in Technical Support organizations and hinders the computer manufacturer's ability to deliver effective support to high-end computing solutions. The technician's access to internal support resources is similarly oriented to the "box" rather than the "solution". The complex interdependencies within the high-end computing and enterprise solutions are constantly changing. The complex interdependencies are also too numerous for technicians to memorize. Accordingly, it would be desirable for on-line system support tools to have an ability to present solution-oriented information to technicians for assisting technicians in their support of these enterprise solutions.

On Site Service:

If a technical support representative decides that a given server or storage device requires service, then the representative may dispatch on-site service to fix the server. The dispatch may include, for example, dispatching a technician who is trained in break/fix tactics for a specific component or all the specific components inside a single "box". For instance, the technician may be perfectly capable of replacing a Fibre Channel host bus adapter (HBA) in a particular server, but may not understand actions required to recover proper operations throughout the solution once the HBA is replaced. It is becoming far more commonplace for that HBA to be plugged into a Fibre Channel switch with complex Fibre Channel zoning definitions that need to be modified or reconfigured if and when that HBA is replaced.

Upgrades:

Adding components and/or software upgrades for a given solution can be very complicated. For instance, significant "missing and wrong" and excessive field rework can be created because the sales and technical support representatives have a service tag focus. Accordingly, the sales and technical support representative are unable to efficiently view upgrade requirements based on the entire solution's configuration.

For example, a customer may desire to purchase an additional server or storage nodes or additional infrastructure for their Storage Area Network (SAN). For that customer, the following must first be determined: the overall topology and size of the SAN, as well as the number of servers and storage in the customer's SAN, what versions of firmware, PROM, device drivers, storage software, etc. are in place before determining the scope of work required, as well as products needed, to upgrade the solution. The process of manually identifying the installed the components and configuration can be very time consuming, as well as prone to error.

Accordingly, it would be desirable to provide a support system having an ability to present solution-oriented information for assisting in the support of enterprise solutions and other large solutions with complex interdependencies.

SUMMARY

A solutions-based computer system manufacturing process includes assembling computer and storage system components for creation of a given solution-based product as a function of a customer order or plan. The process further includes assigning a solution identifier to the solution-based product. The solution identifier includes a solution type and a unique identifier within the solution type.

The embodiments of the present disclosures provide the technical advantage of enabling the presentation of solution-oriented information as a function of a unique solution identifier for assisting in the support of enterprise solutions and other large solutions with complex interdependencies.

DETAILED DESCRIPTION

Figure 1:
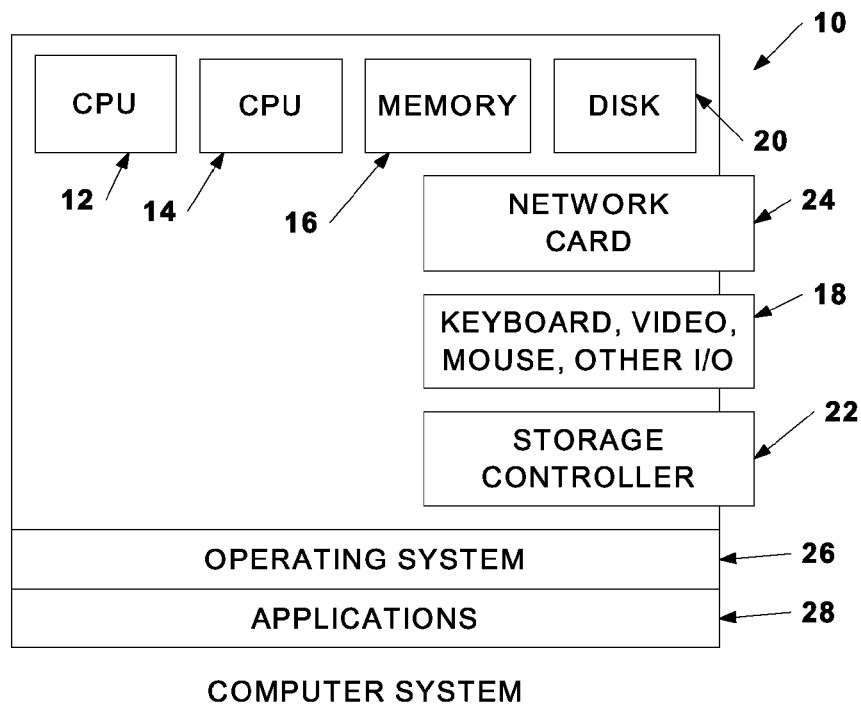
FIG. 1 is a block diagram view of an example computer system solutions-based product manufactured according to one embodiment of the present disclosure.

In FIG. 1, a system block diagram of a solutions-based computer system 10 is illustrated having features thereof configured in accordance with a custom configured computer system order or plan in a build to order manufacturing environment. The computer system 10 includes at least one central processing unit (CPU) (12, 14), memory 16, input/output (I/O) devices, such as a display, a keyboard, a mouse, and associated controllers, collectively designated by a reference numeral 18, a hard disk drive 20, and other storage devices and/or controllers, such as may include a floppy disk drive, a CD-ROM drive, and the like, collectively designated by a reference numeral 22, and various other subsystems, such as a network interface card, collectively designated by a reference numeral 24, all interconnected via one or more buses. One or more computer-readable media, such as a floppy disk, CD-ROM, or the like, may also be included. Computer system 10 further includes at least one or more operating system 26 and at least one or more software applications 28.

Figure 2:
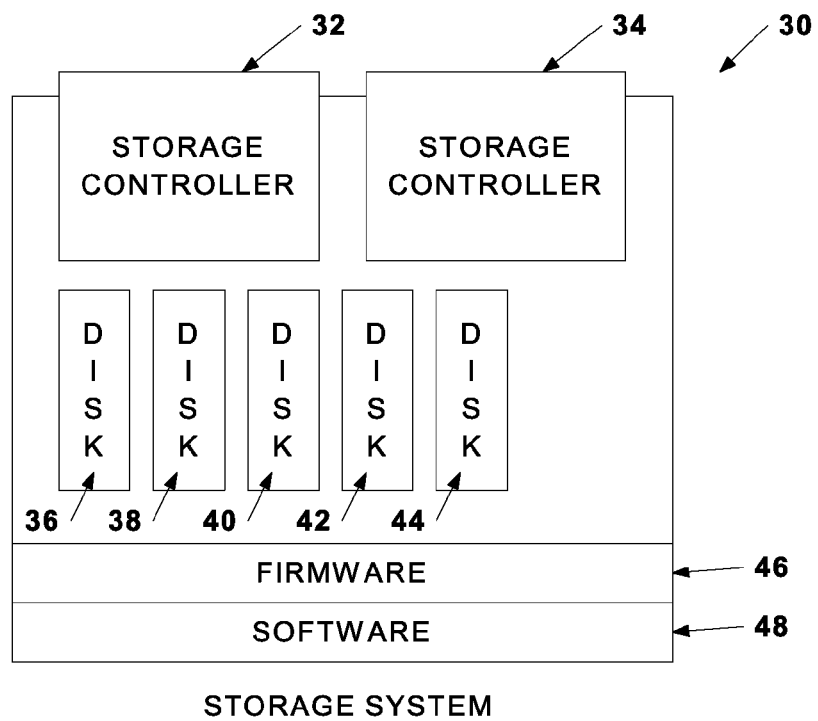
FIG. 2 is a block diagram view of an example storage system solutions-based product manufactured according to another embodiment of the present disclosure.

In FIG. 2, a system block diagram of a solution-based storage system 30 is illustrated having features thereof configured in accordance with a custom configured storage system order or plan in a build-to-order manufacturing environment. The storage system 30 includes at least one or more storage controllers (32,34) and at least one or more disks (36,38,40,42,44). Storage system 30 further includes firmware 46 and software 48.

Figure 3:
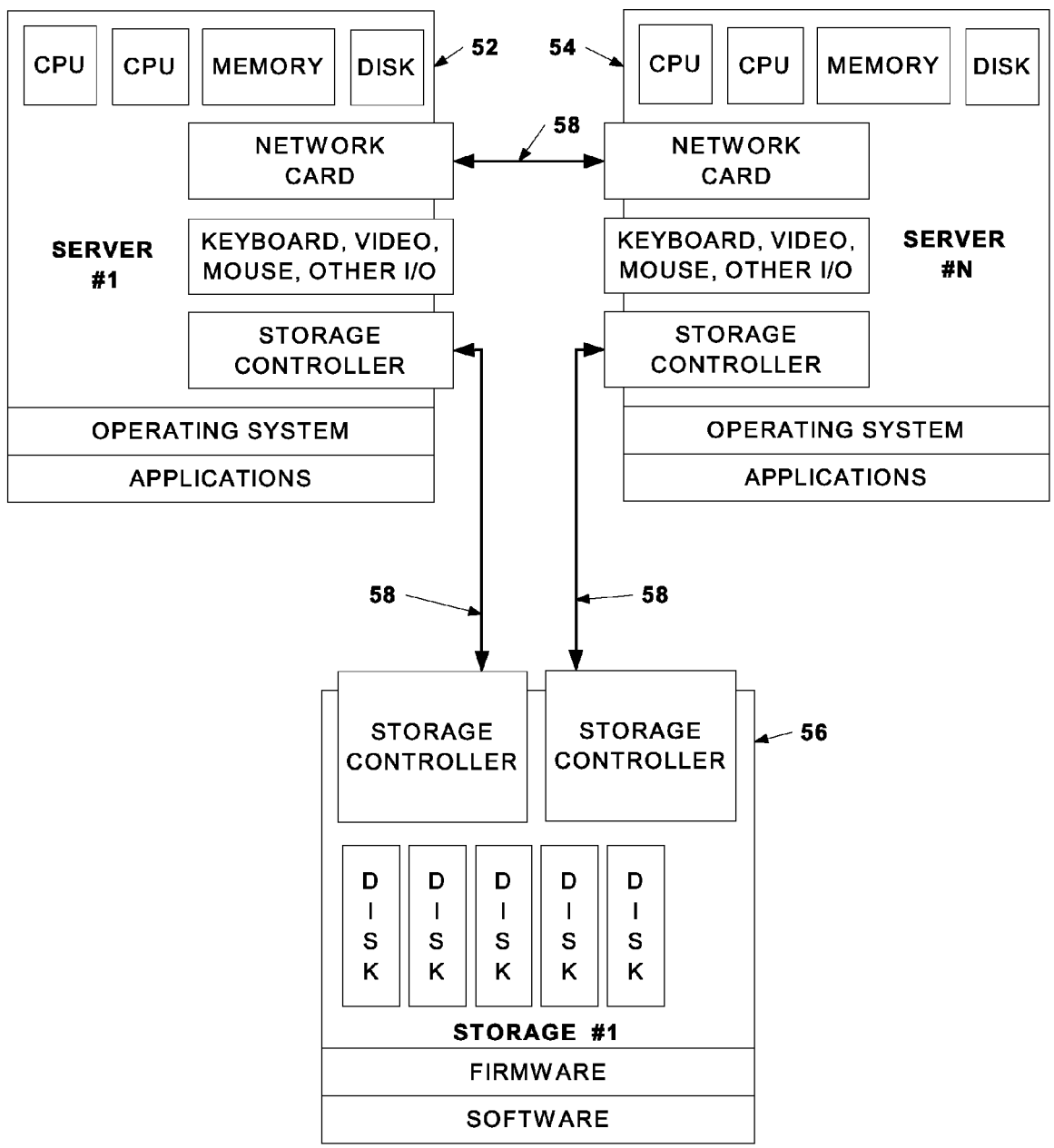
FIG. 3 is a block diagram view of a solutions-based product including servers and storage systems according to another embodiment of the present disclosure.

In FIG. 3, a system block diagram of a solutions-based product 50 is illustrated. The solutions-based product 50 includes at least one or more servers (52,54) and at least one or more storage systems 56 according to another embodiment of the present disclosure. The various systems (52,54,56) are interconnected and/or coupled together according to the particular requirements of the solutions-based product, collectively represented by reference numeral 58. The PowerTag identifier, as discussed further herein, tracks a number of these devices that compose a given solution.

In a build-to-order solutions-based computer system manufacturing environment, hardware components are installed into at least one or more target computer and/or storage systems to be included within a given solutions-based product. The particular hardware components are per a custom order or plan for a given solutions-based product. Predetermined files are downloaded onto the hard drive or storage devices of the target system(s) of the particular solutions-based product. The predetermined files are per the custom order or plan, also. The one or more computer and/or storage system is then paired with other systems, such as other computers, storage devices, and/or network equipment making up the solutions-based product. Software is added to the individual computer and/or storage systems to enable them to function together in a pre-defined way. The process may further include testing of the solutions-based product prior to shipment to a customer.

The solutions-based computer system 10 of FIG. 1 may also represent a PowerTag system for carrying out the PowerTag method as discussed herein. In addition, the PowerTag method of the present embodiments as described herein can be implemented in software, using programming techniques known in the art. The software may further be stored on suitable computer-readable media and/or transmitted via a network, such as, a global computer network or other suitable network.

According to one embodiment of the present disclosure, "PowerTag" includes a logical entity for capturing a specific customer solution. The PowerTag system enables an identification of information for the devices and systems comprising a given solution, as well as service offerings and entitlements. The PowerTag system assigns a unique PowerTag identifier, also referred to herein as a solutions identifier, to the devices and systems comprising the given solution product. A configuration of systems and software linked to a PowerTag identifier may also be updated to reflect a customer's changing installed solution. Additionally, a customer may possess multiple PowerTag identifiers that define multiple installed solutions, respectively.

In accordance with one embodiment, the PowerTag method and system utilizes a "Relational" database model for describing the PowerTag. In the relational terminology, a database is represented by a table. An entry in the database is a row in that table. Each row is made up of a number of fields. Lastly, an index into a database is the relation's primary key.

According to one illustrative embodiment, the notion of a PowerTag applies to multiple complex solutions. Some examples of what a solutions system manufacturer provides in this space may include Microsoft Cluster Server (MSCS), Microsoft and MSCS are trademarks of Microsoft Corporation, High Performance Computing clusters (HPCC), and SAN.

According to one embodiment, the PowerTag includes, at a minimum, two fields for describing the PowerTag. The fields include: 1) type, and 2) unique identifier. Accordingly, each PowerTag includes a concatenation of these two fields as follows:

|Type| |Unique identifier|

Consider the following example. To begin, mappings are assigned for the above-mentioned solutions of MSCS, HPCC, and SAN into prescribed types:

| Solution | Type |
|---|---|
| MSCS: | 1 |
| HPCC: | 2 |
| SAN: | 3 |

In addition to the above, further assume that a numbering scheme for each identifier of a particular type starts at 000000, and that the very first deployment would be 000001. Accordingly, the PowerTag for the very first MSCS deployment is |1| |000001|.

In one embodiment, the PowerTag identifiers are maintained in a PowerTag table, similar to that of the following table:

| Type | Unique Identifier | Description |
|---|---|---|
| 1 | 000001 | MSCS |
| 1 | 000002 | MSCS |
| 2 | 000001 | HPCC |

-continued

| Type | Unique Identifier | Description |
|---|---|---|
| 3 | 000001 | SAN |
| ... | ... | ... |

In use, the sales, services and support, manufacturing, and other similar organizations of a solutions system manufacturer correlates each unique PowerTag identifier to its corresponding individual components, using suitable techniques. For instance, an MSCS cluster conventionally includes two servers (e.g., Server A and Server B) and a storage device. In keeping with the above example, the following service tags might be assigned for the hardware components of the MSCS cluster:

MSCS Cluster
Server A, with service tag ABCD,
Server B, with service tag EFGH, and
Storage device, with service tag IJKL.

In addition, the PowerTag method and system may further include a suitable mechanism to define other attributes and components that may not necessarily be designated with a service tag. For example, components, such as additional software, configuration and diagnostic utilities, and/or systems management software, may not be designated with a service tag. However, such items may be required to implement the solution in the field, wherein revision control, as well as visibility to revisions shipped, is vital to the support of the solution. In one embodiment, a description field in a PowerTag table captures such information particular to a given solution, but for which there exists no service tag. Accordingly, the list of one or more components within a given solution may include these items, as well as the devices bearing a service tag.

Prior to PowerTag, there was no automated way of tying together the service tags above into their representative solution, nor was it possible to record details about the solution itself. With the PowerTag method and system of the present disclosure, the solution identifier of the above-mentioned example would be used for indexing into the PowerTag table that contains all MSCS deployments, with their respective service tags listed. The PowerTag table can also include additional information for capturing the solution systems architecture, design, proof of concept, testing, and deployment of the solution. Accordingly, the PowerTag table enables the solution system manufacturer to provide upgrades, parts, technical support, installation services, etc. to a given customer with improved confidence that an appropriate action can be taken the first time.

In the above example, the PowerTag identifier includes |1| |000001|. The second field from the PowerTag identifier provides an index into an MSCS table. An example solution type table for the solution type MSCS follows:

| Solution ID | Server A | Server B | Storage | Description |
|---|---|---|---|---|
| 000001 | ABCD | EFGH | IJKL | Designed by Dell Technical Consulting Deployed on Jan. 1, 2001 by CDT Revision of MSCS: 1.0 |
| 000002 | QWRQ | LKMV | OAFP | Designed by customer Serviced on Jan. 14, 2001 by Wang |
| ... | ... | ... | ... | ... |

Similarly, the method and system of the present disclosure provides the HPCC, SAN, and other solutions with their own separate tables for capturing the service tags of their respective components, as well as other relevant information, for example, in the description field of a respective solution table.

According to one embodiment, the PowerTag system implements and deploys PowerTag identifiers on a global computer network, such as the Internet, intranet, or other network. In the embodiment, in response to solution object input information, the PowerTag system associates various service tags and other solution objects into a defined solution. Accordingly, the resulting PowerTag solution object possesses attributes to enable efficient viewing and downloading of related documentation, alerts/bulletins, software updates.

According to one embodiment, regardless of whether a PowerTag is constructed during an order entry process, or at a later point in time, for example, by a customer or service representative (e.g., over the Internet or through other means), PowerTags are maintained centrally and used by services, sales, manufacturing, engineering, and other groups, as described herein.

Figure 4:
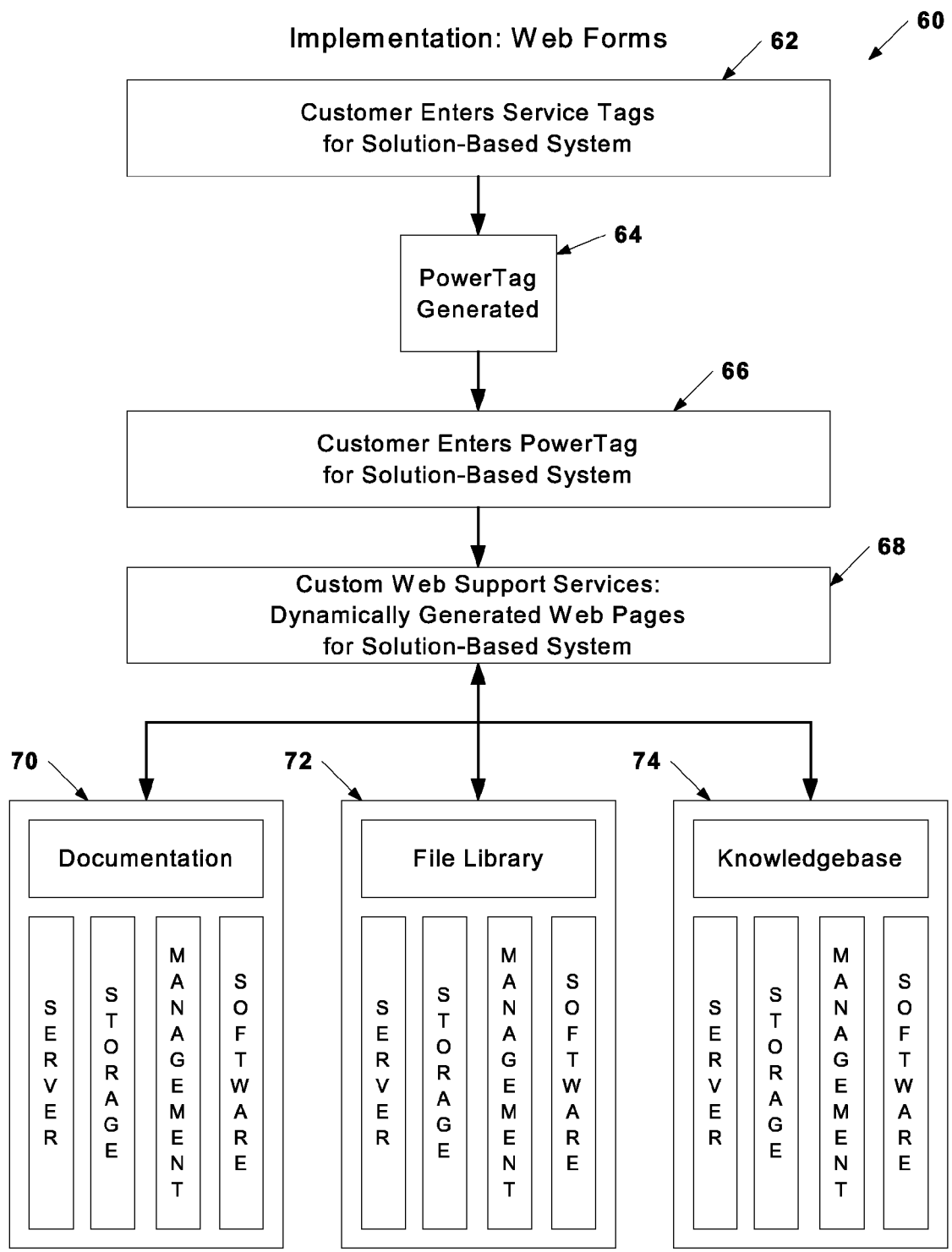
FIG. 4 is a flow diagram view of the PowerTag method and system in accordance with an embodiment of the present disclosure.

FIG. 4 illustrates one implementation 60 of the PowerTag method through on-line web forms. With respect to this embodiment of the PowerTag method, either a customer or a solution system manufacturer representative enters the service tags and select solution components of a respective system solution for use in obtaining a PowerTag identifier, further in connection with obtaining custom support services via the PowerTag method and system.

In connection with the web forms implementation of FIG. 4, for a given solutions-based product, in step 62, a customer enters service tags for each component of the customer's solutions-based product, whether hardware and/or software. The entry of the service tags may be accomplished, for example, via a suitable entry form on a web page hosted by the PowerTag system for implementing the PowerTag method.

Responsive to a completion of entering of service tags for a given solutions-based product, the PowerTag system generates a unique PowerTag identifier in step 64. Generation of the PowerTag identifier is in accordance with that as discussed further herein.

In step 66, a customer and/or service representative enters a PowerTag identifier for a solution-based system. Responsive to entry of the PowerTag identifier, in step 68, the PowerTag system provides custom web support services. For example, the PowerTag system dynamically generates web pages particular to the specific solution-based system. The PowerTag system constructs the dynamically generated web pages using information obtained from one or more of a documentation system 70, a file library system 72, and a knowledgebase system 74, as a function of the PowerTag identifier. The particular web page is further a function of the type of service (e.g., sales, on-line support, on-line documentation, phone-based tech support, on site service, upgrade, entitlement, or other similar type service) being requested by the customer and/or customer service representative, further as discussed herein. In addition, each of the documentation system 70, the file library system 72, and the knowledge base system 74 includes one or more server system, storage system, management system, and corresponding software for the respective system.

The PowerTag solution object may also be the object of an entitlement such as with respect to a "Platinum" or "Gold" service offering. Accordingly, the PowerTag solution object enables rendering of significant improvements in sales and technical support, as well as field-based installations, repairs and upgrades.

According to another embodiment, the PowerTag system includes a factory integrated system for generating PowerTag solution objects as part of the manufacturing process. For example, in the factory integrated PowerTag system, multiple systems and software components are linked into a defined solution for the customer, along with the services sold in support of the solution.

In another embodiment, the PowerTag system applies to computer system vendors. A computer vendor may implement PowerTag using information systems and a direct model. In one example, the direct model relates to a build-to-order computer system manufacturing process.

According to another illustrative embodiment, PowerTag components can include a multitude of various components. For example, the PowerTag components may include one or more of the following:

Servers: each model and the associated service tags, operating system (O/S), basic input output system (BIOS), peripherals and respective drivers, etc.

Storage components: each model and the associated service tags, firmware, programmable read only memory (PROM) revision, etc.

Software: clustering software, backup software, storage consolidation software, storage management and configuration software, factory installed applications, on-site installation of software or applications, etc.

Service offerings: service offerings can include standard (std) availability guarantee, twenty-four hours per day seven days a week (24×7) availability guarantee, "Gold", "Platinum", etc.

On-Site Installation choices: specific to a given solution, there may be installation options that can be automatically planned and coordinated using the solution identifier for the system. For instance, a first service provider comes in for physical wiring of the components, and a second provider comes in to configure software. This coordination can be accomplished by knowing the type of the solution and its specific installation options.

Links to entitlement: statements of work (SOW's), product documentation, software updates, technical bulletins, etc., as they relate to a given solution and it's components.

Sales:

With respect to a computer manufacturer's PowerTag offering, in accordance with an illustrative embodiment of the present disclosure, the computer manufacturer's customers would have additional incentive for purchasing most, if not all, software components with their hardware from the same computer manufacturer. Hardware and software components of a given system solution of configuration would be tied together via a PowerTag identifier. Accordingly, a hardware company could implement support and service for the customer's entire configuration; as opposed to providing support and service just for the hardware components with redirectors to software companies for everything else.

On-Line Support:

With respect to an on-line support web site utilizing the PowerTag system in accordance with the present embodiments, a PowerTag support method may be carried out as follows. A customer or service representative accessing the on-line support enters a PowerTag identifier on the support web site when prompted for the PowerTag. In one embodiment, if the customer or service representative enters a Service Tag instead of the PowerTag, then the PowerTag system performs a search for the appropriate PowerTag identifier within the system, using suitable search techniques. The support web site may include, for example, http://www.support.dell.com, a premier support page, or other support web site.

In response to the entered PowerTag identifier, the PowerTag system outputs information specific to the solution. The solution may include, for example, Fibre Channel, SAN configuration, etc. Accordingly, the customer receives information that is specific to the particular solution. The solution specific information can include one or more of details on component configuration, possible upgrades for BIOS, drivers, firmware, SAN software, etc. In addition, Knowledge Base and File Library systems can be tied in to a solution. Accordingly, the method of implementing an on-line support web site utilizing the PowerTag system and method could include categorizing Knowledge Base and All Files by System results by component, that is, server, storage, cluster software, SAN configuration, etc.

On-Line Documentation:

According to one embodiment, the PowerTag system dynamically constructs an on-line documentation page for a given solution system. For example, a particular on-line documentation page may include at least one or more of server guides, storage guides, a management software guide, cluster guide, SAN guide, etc. The PowerTag system customizes the particular on-line documentation page based upon a customer's installation, further as a function of a corresponding PowerTag identifier.

Phone-Based Tech Support:

The PowerTag method and system apparatus of the present embodiments enable support entities, such as regional expertise centers, for supporting "Platinum" and "Gold" customers, to provide precise and accurate support for complex enterprise solutions. In response to an input of a service tag or PowerTag identifier, the PowerTag system generates information pertaining to the customer's particular solution system. In one embodiment, the PowerTag system further provides a display of the customer's solution and renders the solution visible to the support technician or support team. Accordingly, whether the customer provides a service tag or PowerTag to the support technician, the customer's solution will be immediately visible to the support team. If a support technician receives a service tag that belongs to a solution or the solution ID of a SAN, for example, then the support technician routes the call to a technician trained on Fibre Channel SANs. Equipped with the customer's particular solution, the SAN-trained technician will then have all the necessary information and tools to both diagnose component issues and system issues.

The PowerTag method and system apparatus further provide the advantage of making it easier to troubleshoot a solution. For example, the solution ID would not cover components that a customer may have added to the customer's system solution independent of the original solution system manufacturer. The original solution system manufacture may include, for example, the build-to-order computer system manufacturer. In addition, a customer may have installed an additional SAN-attached node or cluster node not manufacturer-installed. Tracking foreign objects and their respective behavior assists in diagnosis of a problem. Tracking of foreign objects also illuminates potential issues that the customer may not have been aware of when the customer added the additional components.

On Site Service:

A technical support unit of the computer manufacturer may decide that a server needs service and, in response, dispatches on-site service to fix the server. With the use of the PowerTag method and system of the present disclosure, the appropriate information and personnel can be sent to repair and/or fix the issue. For example, if the fix is a firmware update, then the service technician could be sent to the customer site with the service tags of other systems of the customer that must have their firmware upgraded as part of the fix. This "collective upgrade" is needed because many times for upgrading a solution, multiple components within it have to be upgraded, and not just a single component. In addition, when on-site service is dispatched to repair a device within a solution, the servicing party is able to provide the correct skills and tools necessary for the repair action when the PowerTag identifies the entire solution within which the device resides. Such on-site service facilitated via the PowerTag method and system could also be useful for providing service on system solutions having a high availability service offering and guarantee.

Upgrades:

With additional information regarding a particular system solution obtained via use of the PowerTag method and system of the present disclosure, upgrades can be handled more smoothly. For example, if a customer has a four node SAN and wants to add two nodes, then what would the customer need in particular for adding the additional two nodes? The customer might need just two more nodes or the customer might need to upgrade storage software or switch firmware to a new version supporting more nodes (requiring on-site service), etc. The PowerTag method and system facilitates easy accessibility to the necessary information.

According to one embodiment, the PowerTag method and system perform assignment of the Solution IDs implemented via on-line web resources, as well as in an order-entry system for Enterprise-class products. For instance, the order-entry system may be applicable for the ordering of complete cluster systems, storage area networks (SANs), and NAS as storage products. Implementing the PowerTag methodology in this manner will enable the solution system manufacturer to take service and support to a higher level for "productized solutions" that have varying components. The PowerTag method and system may be implemented directly into a business model for doing business over the Internet and direct with customers.

Training:

According to another embodiment, web-based training for complex solutions such as NAS, SAN, Storage Domain Management (SDM), and cluster systems are linked to PowerTags. For example, if a customer seeks support for a server that is part of a SAN PowerTag, then in response to receipt of the SAN PowerTag identifier, the PowerTag system provides the customer with access to links for web-based SAN training.

Accordingly, the PowerTag solutions-based manufacturing and support system method and apparatus advantageously leverages a direct model to support system-based configurations, like SAN, clusters, NAS, and other solution stacks.

Although only a few exemplary embodiments have been described in detail above, those skilled in the art will readily appreciate that many modifications are possible in the exemplary embodiments without materially departing from the novel teachings and advantages of the foregoing disclosure. Accordingly, all such modifications are intended to be included within the scope of these embodiments as defined in the following claims. In the claims, means-plus-function clauses are intended to cover the structures described herein as performing the recited function and not only structural equivalents, but also equivalent structures.

What is claimed is:

1. A method of supporting a plurality of interconnected computer systems, comprising:

providing a solution that includes a plurality of computer systems that are operable to be interconnected in order to function together in a predefined manner, wherein each of the plurality of computer systems includes a service tag that identifies a plurality of hardware components in that computer system;

assigning a solution tag to the solution, wherein the solution tag is associated with each of the service tags and includes information about a plurality of software components used with the solution that allow the solution to function together in the predefined manner;

receiving the solution tag;

using the solutions tag to retrieve solution specific hardware information related to at least one of the plurality of hardware components in at least one of the plurality of computer systems and solution specific software information related to at least one of the plurality of software components used with the solution; and generating a web page including the solution specific hardware information and the solution specific software information.

2. The method of claim 1, wherein the plurality of computer systems includes a server.

3. The method of claim 1, wherein the plurality of computer systems includes a storage system.

4. The method of claim 1, wherein the plurality of software components used with the solution includes system management software, configuration utilities, and diagnostic utilities.

5. The method of claim 1, further comprising:
storing the solution tag and the associated service tags and software information in a database.

6. The method of claim 1, further comprising:
receiving, over a network, the service tag for each of the plurality of computer systems.

7. The method of claim 1, further comprising:
updating the solution tag to reflect an updated computer system in the solution.

8. The method of claim 1, further comprising;
updating the solution tag to reflect an updated software component used with the solution.

9. A manufacturing system comprising:
a processor;
a storage accessible by the processor, the storage including program code processible by the processor for implementing a computer system manufacturing process, the manufacturing process including assembling a solution that includes a plurality of computer systems that are operable to be interconnected in order to function together in a predefined manner, assigning a service tag to each of the plurality of computer systems that identifies a plurality of hardware components in that computer system, assigning a solution tag to the solution, wherein the solution tag is associated with each of the service tags and includes information about a plurality of software components used with the solution that allow the solution to function together in the predefined manner;
a database coupled to the processor for storing the solution tag and the associated service tags and software information;
a network interface coupled to the processor for receiving the solution tag over a network;
a retriever coupled to the processor for retrieving solution specific hardware information related to at least one of the plurality of hardware components in at least one of the plurality of computer systems and solution specific software information related to at least one of the plurality of software components used with the solution; and
a web page generator coupled to the processor for generating a web page including the solution specific hardware information and the solution specific software information and providing the web page over the network.

10. The computer system of claim 9, wherein the plurality of computer systems include a server.

11. The computer system of claim 9, wherein the plurality of computer systems include a storage system.

12. The computer system of claim 9, wherein the plurality of software components used with the solution include system management software, configuration utilities, and diagnostic utilities.

13. The computer system of claim 9, further comprising:
an updater coupled to the processor for updating the solution tag to reflect an updated computer system in the solution.

14. The computer system of claim 9, further comprising:
an updater coupled to the processor for updating the solution tag to reflect an updated software component used with the solution.

* * * * *